(12) United States Patent
Morita et al.

(10) Patent No.: US 8,146,509 B2
(45) Date of Patent: Apr. 3, 2012

(54) TRAMWAY TRANSIT SYSTEM

(75) Inventors: Katsuaki Morita, Horishima-ken (JP); Masahiro Yamaguchi, Horishima-ken (JP); Kosuke Katahira, Horishima-ken (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 487 days.

(21) Appl. No.: 11/856,022

(22) Filed: Sep. 15, 2007

(65) Prior Publication Data
US 2008/0083345 A1  Apr. 10, 2008

(30) Foreign Application Priority Data

Sep. 15, 2006  (JP) ................... 2006-251652

(51) Int. Cl.
*B60M 1/34* (2006.01)
*B62D 3/00* (2006.01)
(52) U.S. Cl. ..................... 104/140; 180/400
(58) Field of Classification Search .......... 104/140, 104/145, 242, 243, 245, 246; 180/400, 417, 180/418
See application file for complete search history.

(56) References Cited

U.S. PATENT DOCUMENTS

| 5,623,878 | A * | 4/1997 | Baxter et al. .................... 104/85 |
| 6,237,504 | B1 | 5/2001 | Tanahashi et al. |
| 6,722,270 | B2 | 4/2004 | Koyama |
| 2005/0175467 | A1 | 8/2005 | Yogo |

FOREIGN PATENT DOCUMENTS

| JP | 51-85186 U | 7/1976 |
| JP | 01-27492 Y2 | 8/1989 |
| JP | 2000172336 | 6/2000 |
| JP | 3185512 | 5/2001 |
| JP | 2002351544 | 12/2002 |
| JP | 3414599 | 4/2003 |
| JP | 2003136288 A | 5/2003 |
| JP | 2004263806 A | 9/2004 |
| JP | 2006175962 A | 7/2006 |
| JP | 2006205944 A | 8/2006 |
| JP | 2006205946 A | 8/2006 |
| JP | 2006321445 | 11/2006 |

OTHER PUBLICATIONS

Japanese Office Action for JP2006-251652, issued Aug. 19, 2008.

* cited by examiner

*Primary Examiner* — Joe Morano, IV
*Assistant Examiner* — R. J. McCarry, Jr.
(74) *Attorney, Agent, or Firm* — Kanesaka Berner & Partners, LLP

(57) ABSTRACT

A tramway transit system for allowing a vehicle to travel along a track while automatically steered is proposed, in which the vehicle is provided with guard wheels and the track is provided with a protection track, and simplification in construction and weight saving of the automatic steering mechanism provided to the vehicle and space saving for the installation of the mechanism, can be attained. The vehicle (12) is provided with a steering mechanism (26) for steering the front and rear wheels (20, 22) by means of electrically driven oil hydraulic actuators 36, the protection track (14) is laid down on the road surface (15) of the track (01), the vehicle (12) is provided with guard wheels (40), and the interlocking mechanism (48) for connecting the guard wheels to the right or left wheels, the actuator (36) comprising the hydraulic cylinder (60), the two-way discharge pump (76), the variable speed, reversible rotation motor (78), and the closed circuit (82) provided with relief valves (86).

6 Claims, 14 Drawing Sheets

FIG.13
(a)
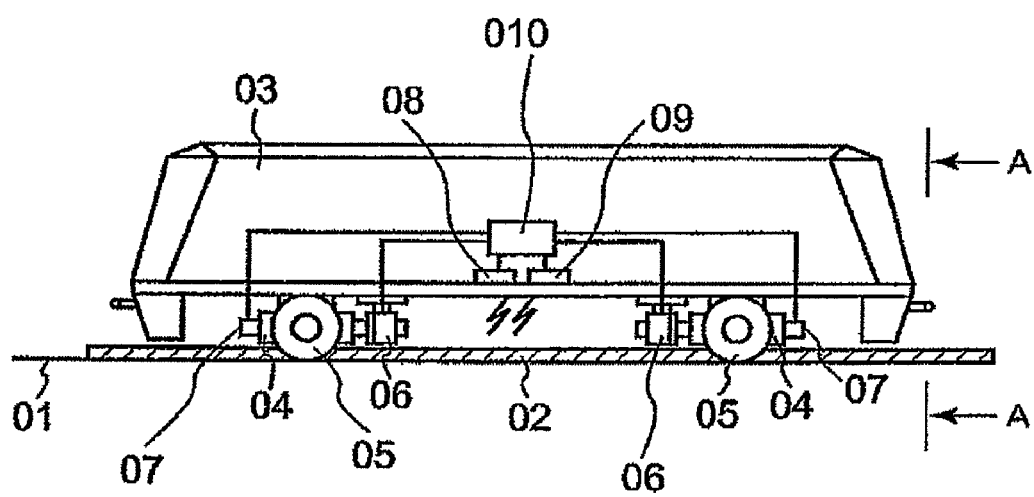
(b)
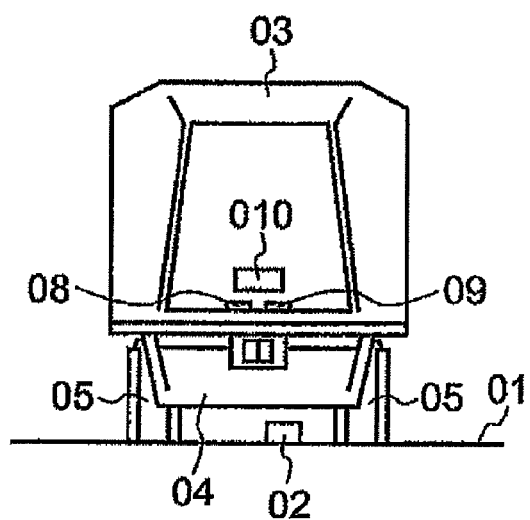
A-A

TRAMWAY TRANSIT SYSTEM

RELATED APPLICATIONS

The present application is based on, and claims priority from, Japan Application Number 2006-251652, filed Sep. 15, 2006, the disclosure of which is hereby incorporated by reference herein in its entirety.

BACKGROUND OF THE INVENTION

1. Field of the Invention

The present invention relates to a tramway transit system in which vehicles having wheels equipped with for example rubber tires travel on a pre-established tramway, specifically relates to an actuator of an automatic steering mechanism of the vehicle.

2. Description of the Related Art

A vehicle supported by wheels with rubber tires for a new transit system is generally provided with guide wheels so that the vehicle is steered to travel along the tramway, the steering being usually done mechanically through the guide wheels engaging with a guide rail laid along the tramway.

The mechanical guide mechanism is superior in point of view of safety and reliability, however, structure of bogies to which the wheels and driving mechanism thereof are mounted inevitably becomes complicated, is increased in weight, and results in increased running cost. Further, it is necessary to lay down the guide rail having enough strength to support the guide rails all along the tramway with high accuracy, so vast amounts of construction cost of the tramway is needed.

In order to eliminate the above problem, a steering system not requiring a guide rail is proposed in Japanese Laid-Open Patent Application No. 2002-351544 (patent literature 1).

The steering system of a tramway vehicle disclosed in the patent literature 1 is composed such that a plurality of on-ground devices which memorize and send out information necessary for operation of the vehicle are laid down along the whole length of the track on which the vehicle travels, the control device installed on the vehicle emits signals based on the information sent out from the on-ground devices when the vehicle travels along the track, and the vehicle is steered by the steering device installed on the vehicle in accordance with the signals. With the steering system, a guide rail for steering the vehicle is not required, construction and maintenance costs can be reduced, and also vibration and noise are reduced.

The steering system of the patent literature 1 will be explained referring to FIGS. 13 and 14. FIG. 13a is a schematic side elevation of the conventional steering system, and FIG. 13b is a schematic front elevation thereof. FIG. 14 is a schematic plan view of the conventional steering system.

Referring to FIGS. 13a, 13b, reference numeral 03 is a vehicle used in the new tramway transit system, the vehicle 03 travels along a track 01. The vehicle 03 is supported on front and rear bogies 04 which supported by wheels with rubber tires 05 attached thereto. The wheels are driven by drive motors 06 and steered by actuators 07.

The steering system includes on-ground devices 02, a transmitter 09, a receiver 09, a control device 010, and a steering device 020. The vehicle is steered by turning the wheels 05. A plurality of non-exited on-ground devices 02 are laid down on the track 01 along whole length thereof at a predetermined spacing. Specific information is memorized in each of the on-ground devices. The specific information includes the discrimination number, position information, track information, and control information of the concerned on-ground device.

Position information (geographic site information) is information concerning the position of each on-ground device 02 such as the absolute coordinate point and distance from a reference point. Further, track information expressing conditions of the track at the site of each on-ground device such as the gradient, curvature, cant, ramification of the track are memorized in each of the on-ground device as necessary.

Although the on-ground devices 02 are not exited, i.e. have not been provided with power sources, emit signals of the information memorized upon receiving electric power. The on-ground device 02 has for example an electronic circuit including ROM for memorizing operation information.

The transmitter 08 is a device for feeding electric power by means of a radio wave. The receiver 09 is a device for receiving the operation information emitted from the on-ground device 02 when the device 02 has received the radio wave. The control device 010 is a device for performing prescribed processing based on the operation information the receiver 09 received and transmitting directive signal of speed and steering of the vehicle to the drive motor 06 and actuator 07.

Referring to FIG. 14, the steering device 020 is a device for turning the wheel 05 under the steering directive and comprises an electric or hydraulic or pneumatic actuator 07 connected to an end of an arm 011 of which the other end is supported for rotation by a pin 012 fixed to the bogie 04, a connecting rod 059, levers 056a and 056b for left and right wheel 05 respectively, and a tie rod 057 for connecting the levers.

When the actuator 07 is actuated by the steering directive from the control device 010, the arm 011 is rotated about the pin 012 and the levers 056a, 056b are turned via the connecting rod 059 and the tie rod 057 to turn the wheels 05 to the right or left.

According to the system, the vehicle 03 is steered based on operation information memorized in the on-ground devices 02 without using a guide rail, etc. Therefore, construction cost of the track 01 is decreased to a large extent because the guide rail, etc. is not needed. Further, as wear-out parts such as guide wheels are not used, maintenance cost is decreased. Also, occurrence of vibration and noise which will occur when the guide rail and guide wheels are provided due to the contact between them is eliminated.

However, according to the steering system disclosed in the patent literature 1, as mechanical steering by means of the guide rail and guide wheels is not provided, it is difficult to secure safety of vehicle traveling against runaway and running out of track when malfunction occurs in the steering system and under abnormal circumstances caused by strong wind, rainfall, snowfall, etc.

Further, there occur gradual deviations of the vehicle friction from the running course caused by changes in the road friction coefficient, the number of passengers, and wear of the tires, so it is necessary to correct such deviations in order to secure safe and efficient high speed traveling of the vehicle.

Therefore, in a tramway transit system in which a vehicle travels along a predetermined track under automatic steering without using mechanical guiding means by a guide wheel, guide rail, etc., it is important to provide means for securing safety, correcting deviations of the vehicle.

However, is no system with which above mentioned problems are solved sufficiently by a compact and weight saving construction and effective high speed operation can be made possible.

The inventors proposed in Japanese Patent Application No. 2005-148401 (patent literature 2) a tramway transit system with fail-safe function in which the vehicle is provided with a steering mechanism for automatically steering the vehicle by means of an actuator and guard wheels which do not contact a protection track laid down along the track when the vehicle is traveling under automatic steering. The system is provided with a fail-safe means so that when abnormal circumstances occur the automatic steering is stopped, the guard wheels contact the protection track, and the vehicle is steered via the guard wheels contacting the protection track.

In Japanese Patent No. 3185512 is disclosed an automatic steering device, in which a manual and automatic input system of steering force are connected parallel to a steering force control system of a power steering mechanism, and when the driver of the vehicle inputs a steering force larger than a automatically applied steering force, steering by the driver is prioritized.

In the patent literature 2, when malfunction occurs in the steering mechanism and the guard wheels contact the protection track, reaction force the guard wheels receive from the protection track is transmitted to the steering mechanism. The actuator disclosed in the patent literature 2 consists of an electric motor, a ball screw type feed mechanism connected to the output shaft of the electric motor, and a deed nut member engaged with the ball screw. An actuation rod for steering the wheels is connected to the feed nut member. The actuator of this construction is simple in structure, however, large reaction force exerts on the guard wheels and steering mechanism when the guard wheels contact the protection track caused by malfunction of the steering mechanism or disturbances, which may induce damage of the guard wheels or occurrence of deformations of constituent parts of the steering mechanism and shorten the life of the guard wheels or add to wear of the constituent parts of the steering mechanism.

The actuator of the automatic steering mechanism of the patent literature 3 adopts oil hydraulic servo cylinder. With the actuator of this type, reaction force due to contact of the guard wheels with the protection track when malfunction occurs in the steering mechanism can be reduced by providing a relief valve. However, a hydraulic circuit including a hydraulic pressure generator, working oil storage tank, and control valve is required to be provided. Therefore, a large underfloor space is required to accommodate these devices including piping, maintenance of the devices and piping is necessary, and particularly care and attention must be paid concerning oil leaks.

Further, when an air servo cylinder is adopted for the actuator of the automatic steering mechanism, a large air tank and high performance air compressor are required. As air pressure obtainable is about one tenth of that of oil, an air cylinder of large size must be adopted and larger space for accommodating devices is required.

Reaction force the guard wheels receive from the protection track when the guard wheels contact with the protection track caused by malfunction of the steering mechanism or disturbances can be reduced by lowering pressure in the air circuit, however, retard in controlling tends to occur. Further, steering by means of guard wheels when malfunction occurs in the steering mechanism is unstable as is in the case of the oil hydraulic servo cylinder.

SUMMARY OF THE INVENTION

The present invention was made in light of the background mentioned above, and the object is to provide a tramway transit system with fail-safe function in which a vehicle provided with guard wheels travels while automatically steered on a pre-established track provided with a protection track, simplification in construction and weight saving of the automatic steering mechanism, and space saving for the installation of the mechanism, can be attained, and reaction force exerted on the automatic steering mechanism caused by reaction force which the guard wheels receive from the protection track due to contact of the wheels with the protection track when malfunction occurs in the automatic steering mechanism, is reduced, and stable traveling of the vehicle is secured.

To attain the object, the invention proposes a tramway transit system in which a vehicle travels along pre-established track, wherein the vehicle is provided with a steering mechanism having an electrically driven oil hydraulic actuator with which front wheels and rear wheels of the vehicle are steered automatically, the track is provided with a protection track laid down on the track, the vehicle is provided with a guard wheel assembly having at least a pair of guard wheels which protrude into a groove of the protection track without contacting side walls thereof at a front part and rear part respectively under the vehicle, an interlocking mechanism is provided so that a center line connecting centers of the pair of the guard wheels is directed by the steering mechanism in the same direction of the front wheels or rear wheels during traveling of the vehicle, wherein said electrically driven oil hydraulic actuator comprises a hydraulic cylinder connected via a movable rod to at least one of right and left wheels of the vehicle, a two-way discharge pump which can supplying working oil to both actuating rooms of the hydraulic cylinder, a variable speed, reversible rotation motor for driving the two-way discharge pump, and a closed hydraulic circuit including the two-way pump and the hydraulic cylinder and having relief valves for releasing the working oil to an oil storage tank when pressure in the hydraulic circuit exceeds a prescribed permissible pressure.

According to the invention, working oil pressurized by the two-way discharge pump driven the variable speed, reversible rotation motor is directly introduced to the cylinder. The cylinder rod of the hydraulic cylinder can be moved forward and backward along the cylinder by a desired distance through controlling the amount and direction of working oil flow by controlling the variable speed, reversible rotation motor.

As the amount and direction of working oil flow are controlled by the variable speed, reversible rotation motor in this way, a control valve, orifice, etc. are not necessary to be provided in the hydraulic circuit. Therefore, energy loss other than friction loss in the hydraulic cylinder and flow resistance in the hydraulic circuit can be eliminated.

Further, when operation of the actuator is stopped, the pump is not driven by the motor and electric power is not consumed, marked energy saving is attained as compared to the conventional actuator.

As it is not required to provide a relief valve, orifice, etc. in the hydraulic circuit, the electric driven oil hydraulic actuator can be constructed compactly, space for providing a special hydraulic circuit is not needed, and as piping is reduced to a minimum, fear of oil leaks is eliminated. Further, as the drive directive to the variable speed, reversible rotation motor can be given by a control program, the motor can be controlled so that when reaction force exerting on the motor exceeds a prescribed value the motor output does not increase further, thereby preventing occurrence of damage in the motor.

The vehicle can detect its position for example by counting rotation numbers of the shaft of the induction motor for driving the vehicle wheel. In the tramway transit system of the invention, usually the vehicle travels steered by the steering directive based on the steering pattern corresponding to the cite information and track information without allowing the guard wheel to contact the protection track.

In the system of the invention, the cylinder rod of the hydraulic cylinder and the guard wheel assembly are connected by means of a mechanical link mechanism, whereby steering of the vehicle is compensated by reaction force the guard wheels receive from the protection track when the guard wheels contact the side walls of the groove of the protection track.

As the actuator is linked mechanically to the guard wheels, reaction force that the guard wheels receive from the side wall of the groove of the protection track is transmitted to the actuator when the guard wheels contact the side wall due to occurrence of malfunction in the steering mechanism. According to the invention, the hydraulic circuit is composed as a closed circuit, and working oil moves between the both actuation rooms of the hydraulic cylinder, so the reaction force transmitted to the actuator can be reduced as compared with the case of an actuator of ball screw type.

Further, in the system of the invention, relief valves are provided in the hydraulic circuit, with which maximum pressure in the hydraulic circuit can be limited, so the reaction force transmitted from the guard wheels to the actuator is limited.

As the hydraulic circuit is a closed circuit, the hydraulic cylinder functions as a damper, and traveling of the vehicle guided by the guard wheels is stable when an abnormality occurs to the automatic steering mechanism. Further, as a clutch and ball screw which inevitably accompany friction losses are not used, deterioration in control performance caused by friction does not occur.

In the system of the invention, in a case the hydraulic cylinder is of a single rod type, by providing a compensation circuit to the closed hydraulic circuit, difference between an amount working oil flowing into one of the actuating rooms of the hydraulic cylinder and an amount of working oil flowing out from the other actuating room of the hydraulic cylinder is compensated so as to equalize suction amount and discharge amount of working oil of the two-way discharge pump.

Further, by composing such that the cylinder rod of the hydraulic cylinder and the movable rod which extends obliquely to the cylinder rod are connected to a linear guide supported by a linear rail slidably in longitudinal direction of the hydraulic cylinder, connecting parts of the cylinder rod and the movable rod extending at angles different to each other from the connecting parts to the linear guide can be smoothly reciprocated in the longitudinal direction of the hydraulic cylinder, for the hydraulic cylinder experiences force only in the longitudinal direction thereof.

It is suitable to provide a restoration spring device of which an end is fixed to the vehicle body and the other end is fixed to the guard wheel assembly so that the restoration spring device apply spring force to the guard wheel assembly so that the center line connecting centers of the pair of the guard wheels is always directed in the same direction of the vehicle straight traveling direction.

By this, when malfunction occurs in the steering mechanism and the vehicle is steered by the guard wheel assemblies, the vehicle is guided stably along the protection track, for the restoration spring devices exert force to direct the guard wheel assemblies to direct in the vehicle traveling direction. Particularly when traveling at high speed, control of the vehicle is difficult and the vehicle tends to travel snaking its way, so the provision of the restoration spring devices is effective.

BRIEF DESCRIPTION OF THE DRAWINGS

FIG. 13a is a schematic side elevation of the conventional steering system, and FIG. 13b is a schematic front elevation thereof.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
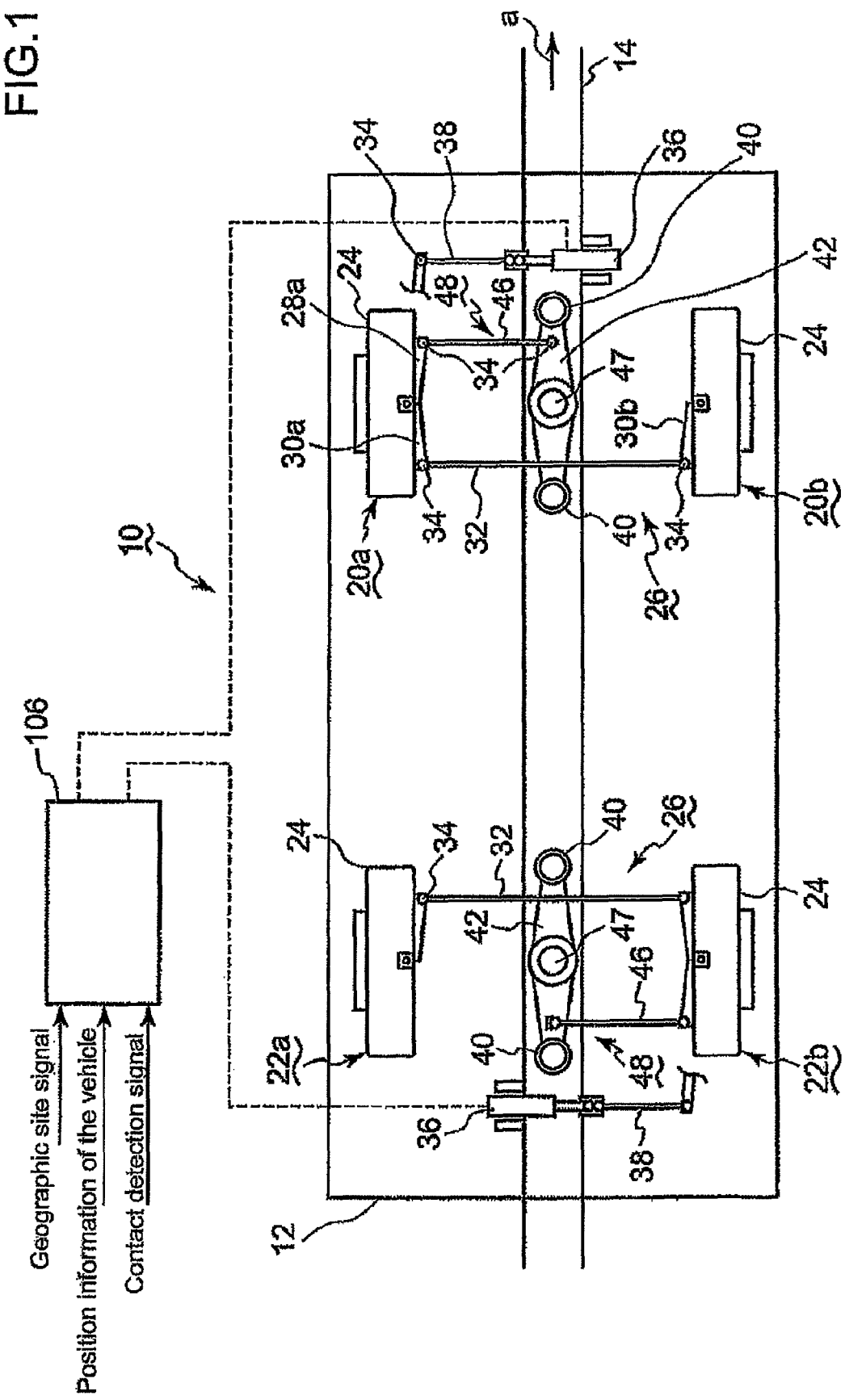
FIG. 1 is a schematic plan view of a first embodiment of the tramway transit system according to the present invention.
Figure 2:
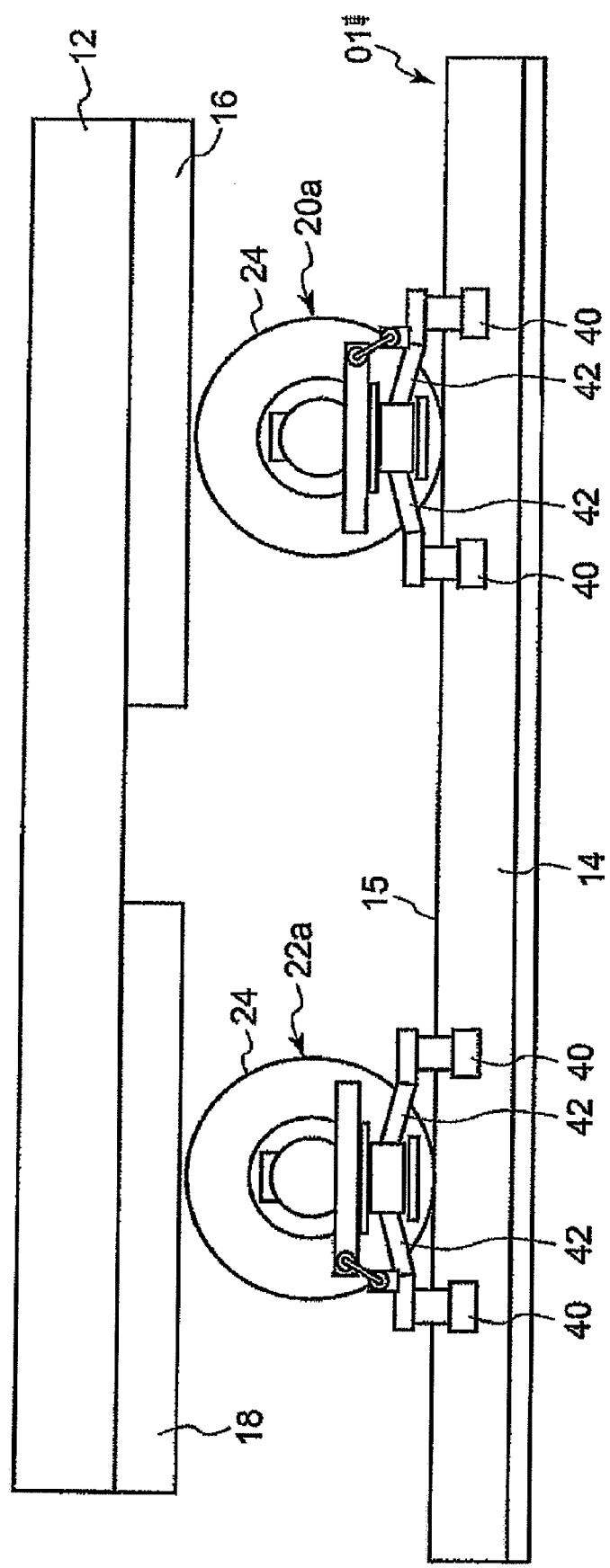
FIG. 2 is a schematic side elevation of the first embodiment shown in FIG. 1.
Figure 3:
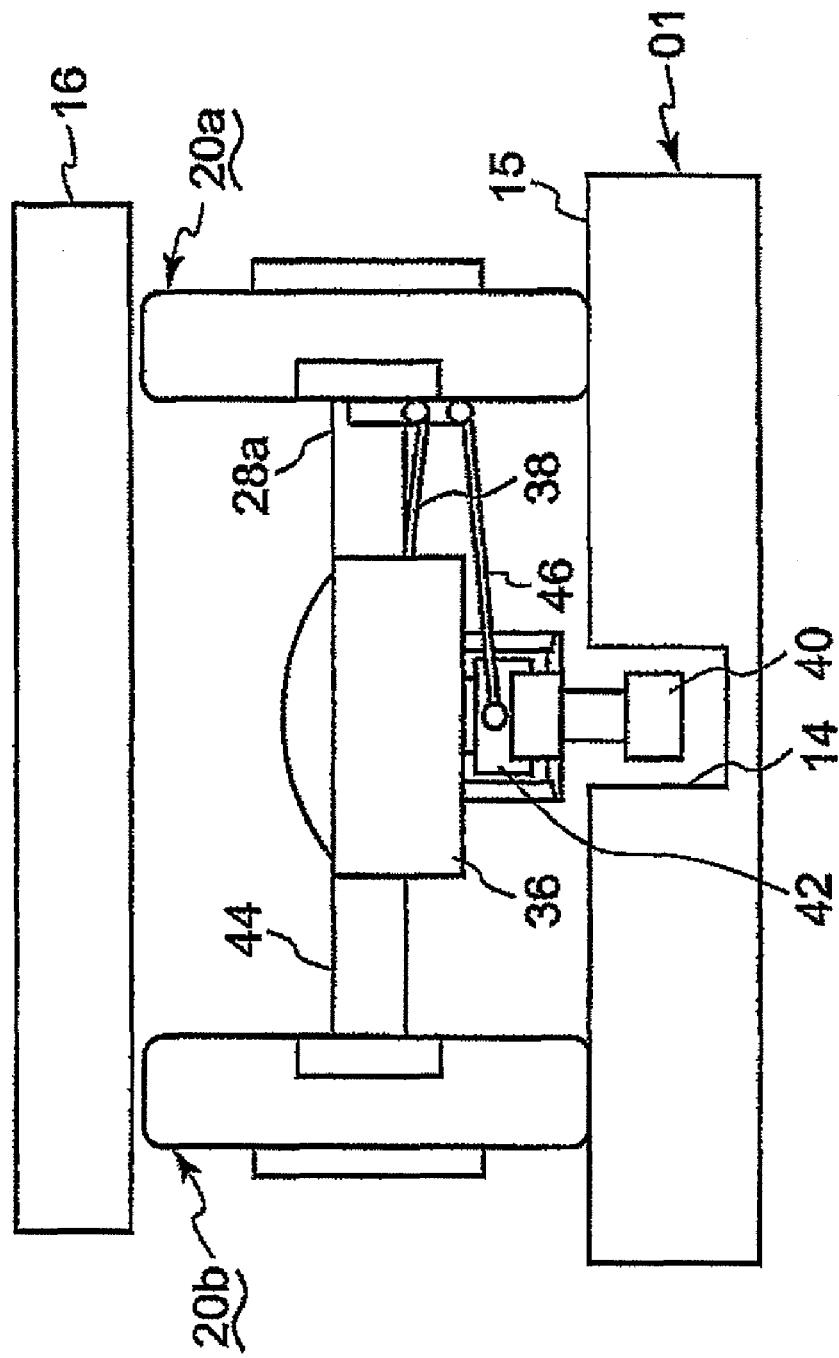
FIG. 3 is a schematic front elevation of the first embodiment shown in FIG. 1.
Figure 4:
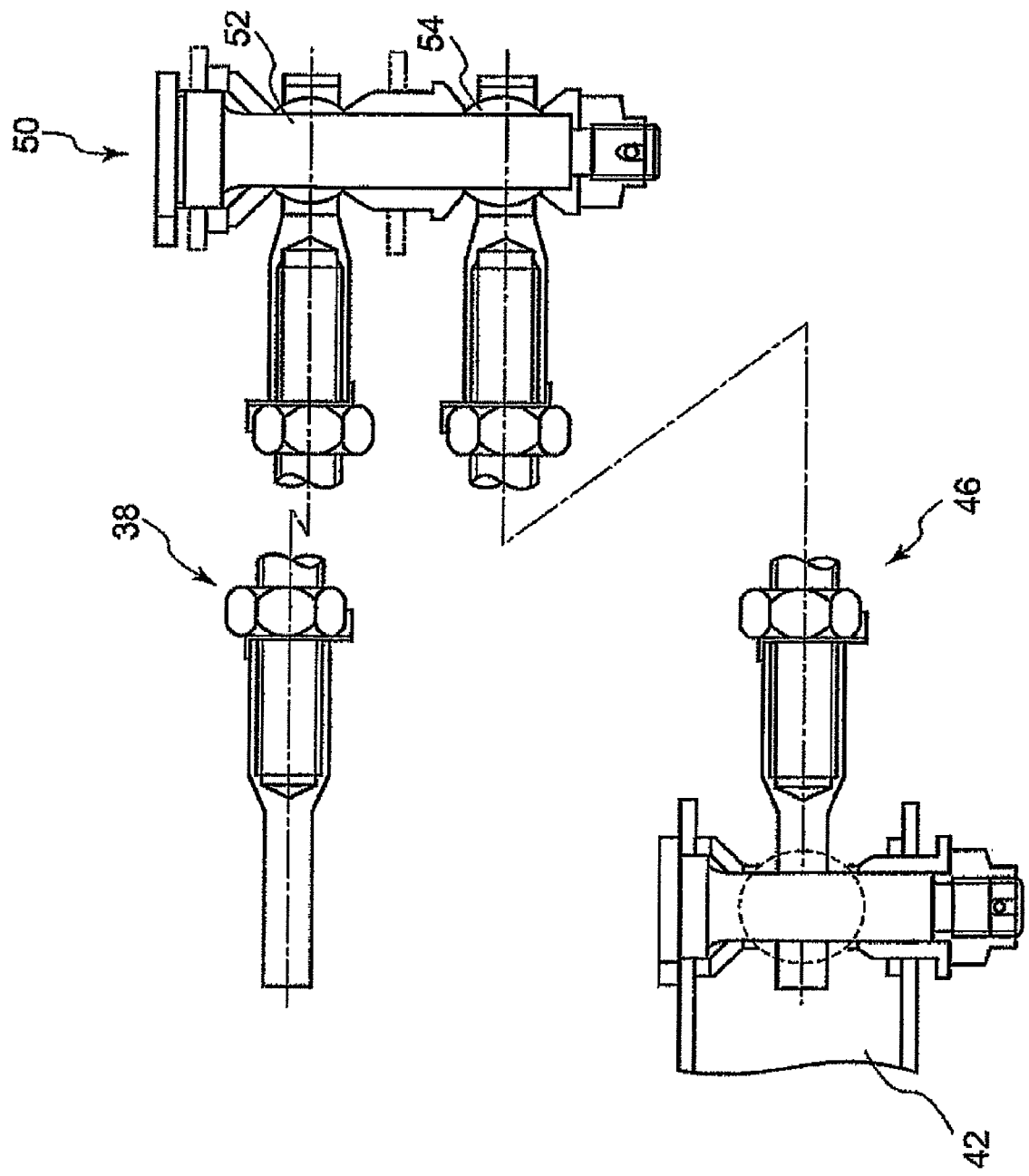
FIG. 4 is an enlarged front elevation of the twin spherical joint part of the first embodiment shown in FIG. 1.
Figure 5:
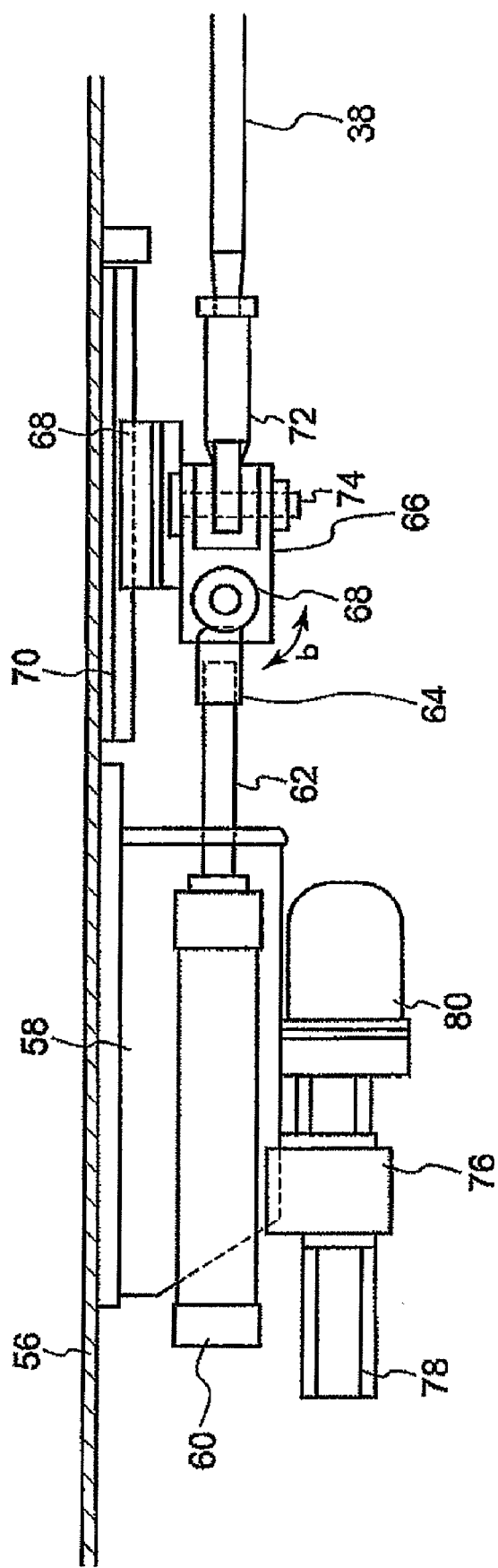
FIG. 5 is a side elevation showing the electrically-driven oil hydraulic actuator.
Figure 6:
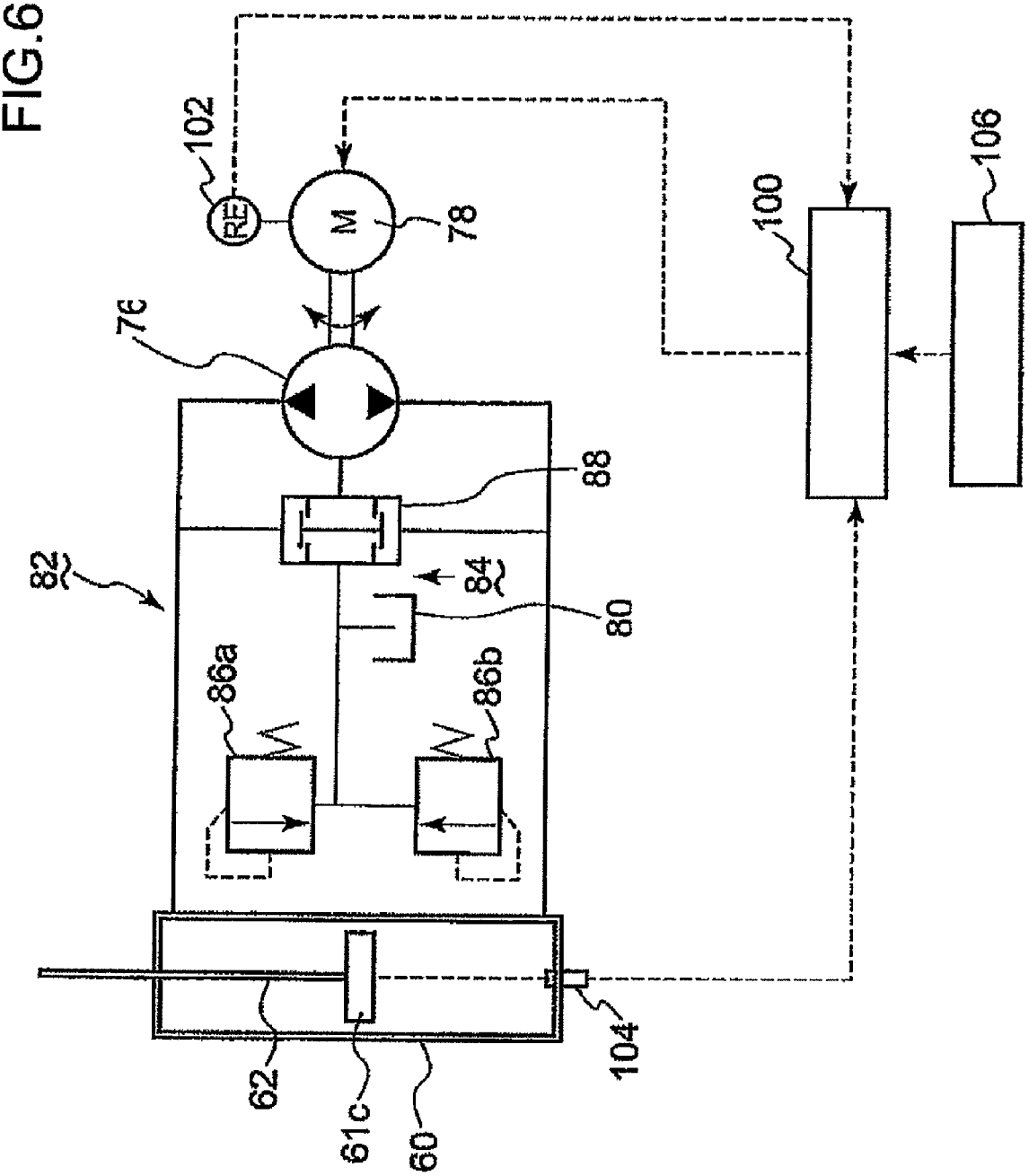
FIG. 6 is a block diagram of the hydraulic circuit for the electrically-driven oil hydraulic actuator.
Figure 7:
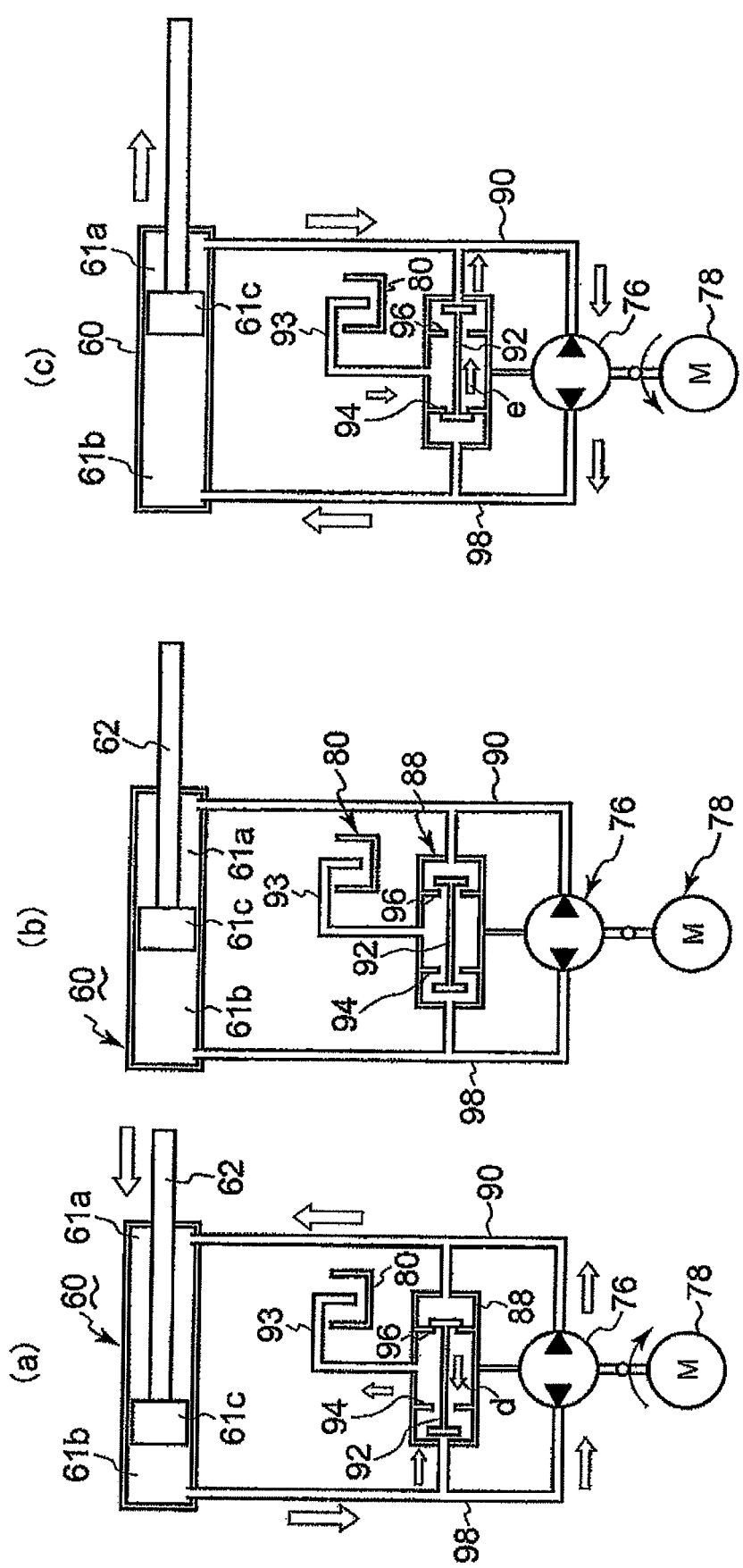
FIGS. 7a, b, c are drawings for explaining the operation of the compensating circuit for the hydraulic circuit of FIG. 6.
Figure 8:
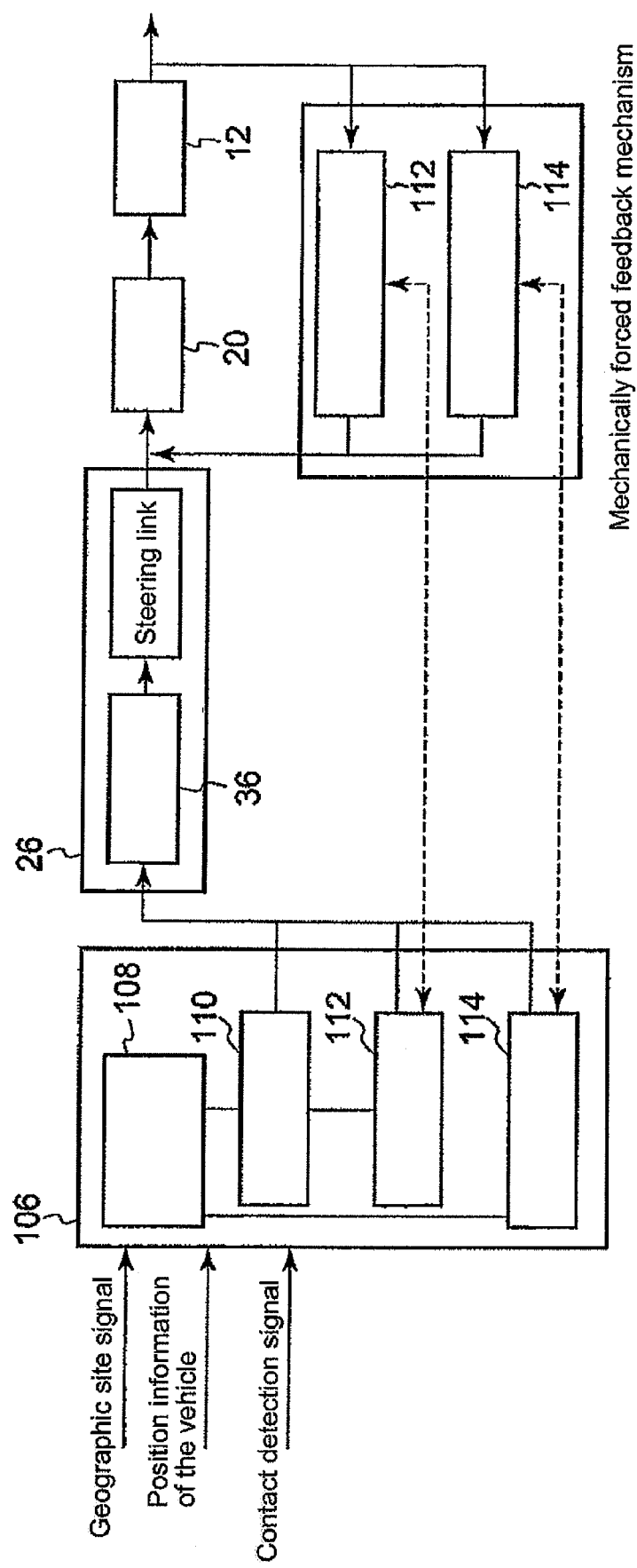
FIG. 8 is a block diagram of the control system of the steering mechanism of the first embodiment shown in FIG. 1.
Figure 9:
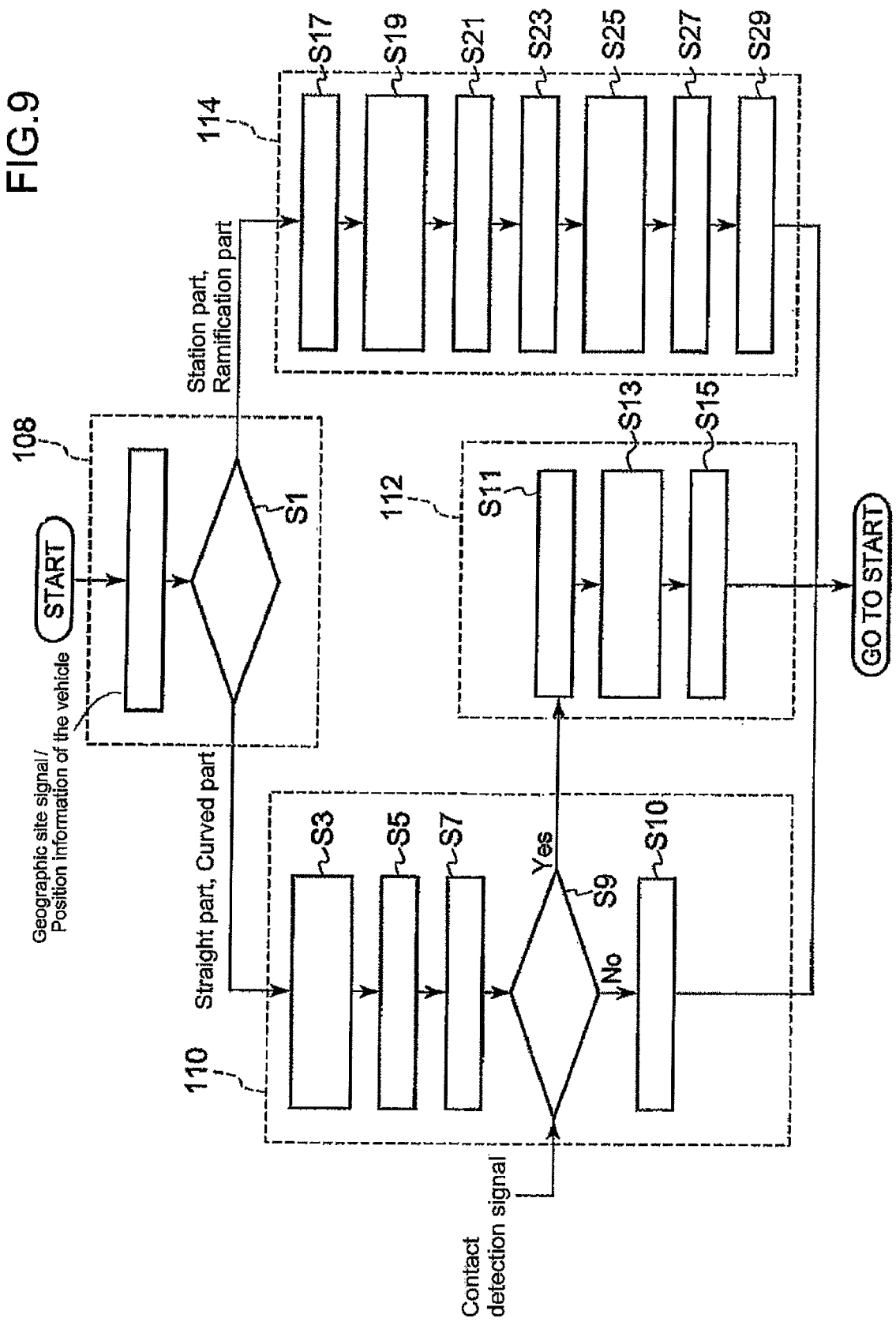
FIG. 9 is a flowchart of the control system of FIG. 7.
Figure 10:
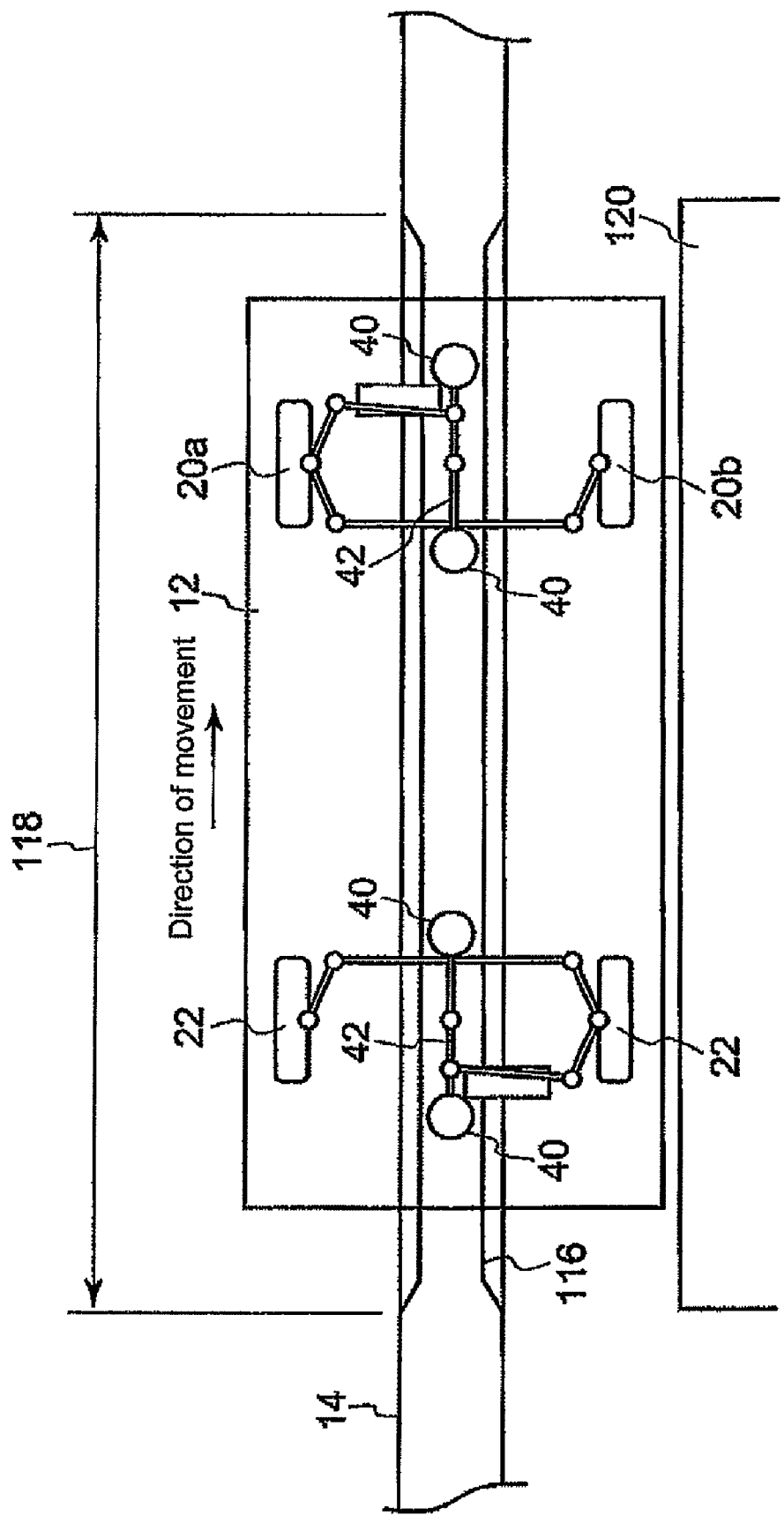
FIG. 10 is a drawing for explaining the vehicle attitude correction means of the first embodiment shown in FIG. 1.

A first embodiment of the tramway vehicle of the invention is shown in FIGS. 1-10. FIG. 1 is a schematic plan view, FIG. 2 is a schematic side elevation, FIG. 3 is a schematic front elevation, FIG. 4 is an enlarged front elevation of the twin spherical joint part, FIG. 5 is a side elevation showing the electrically-driven oil hydraulic actuator, FIG. 6 is a block diagram of the hydraulic circuit for the electrically-driven oil hydraulic actuator, FIGS. 7a, b, c are drawings for explaining the operation of the compensating circuit for the hydraulic circuit, FIG. 8 is a block diagram of the control system of the steering mechanism, FIG. 9 is a flowchart of the control system, and FIG. 10 is a drawing for explaining the vehicle attitude correction means.

Figure 11:
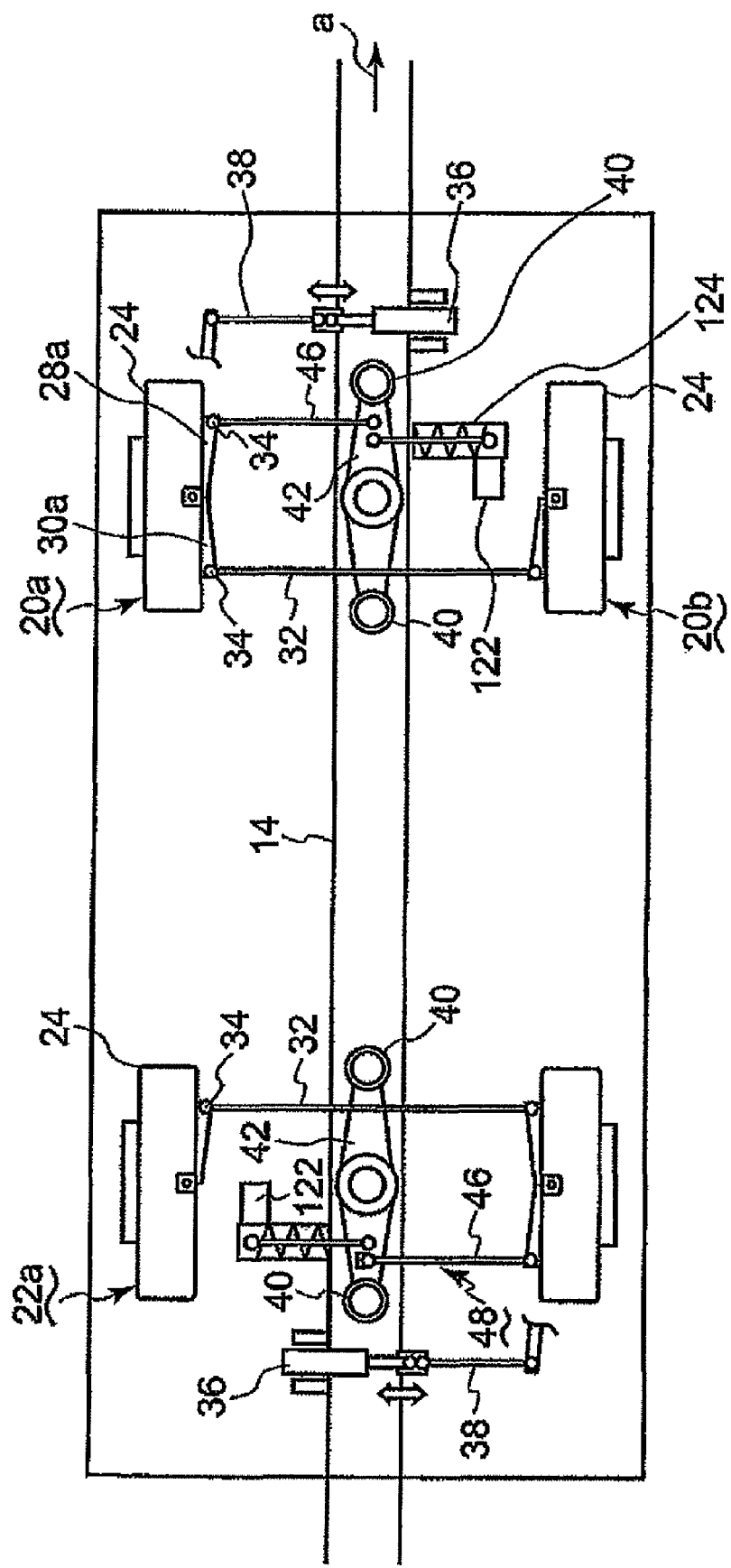
FIG. 11 is a schematic plan view of a second embodiment of the tramway transit system according to the present invention.
Figure 12:
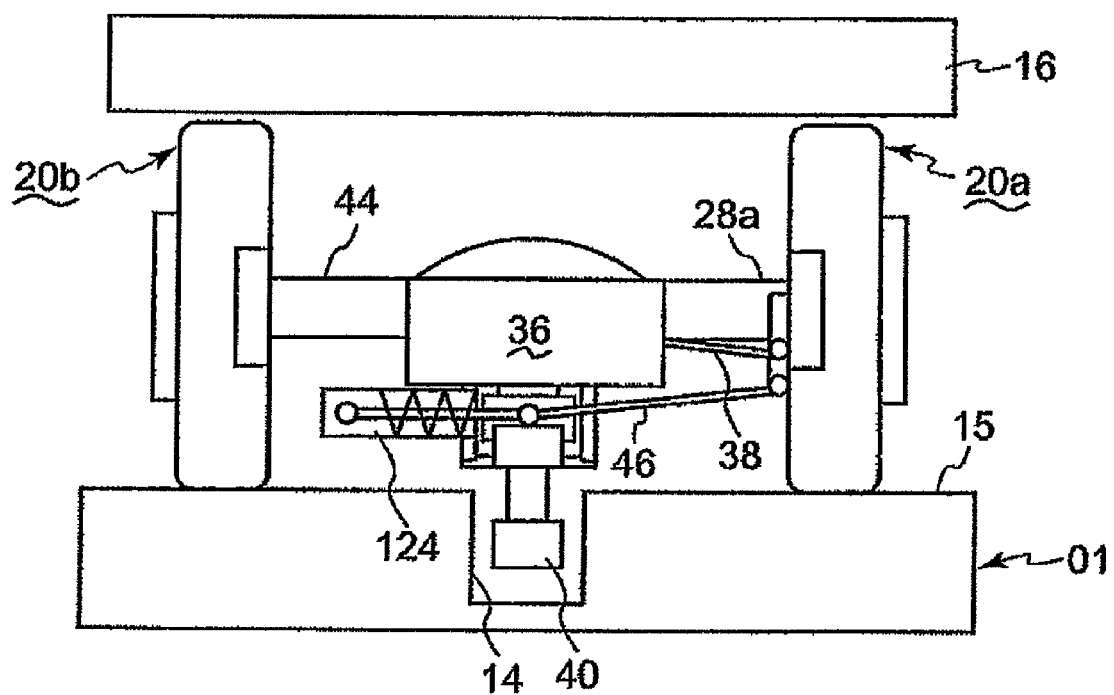
FIG. 12 is a schematic side elevation of the second embodiment shown in FIG. 11.
Figure 14:
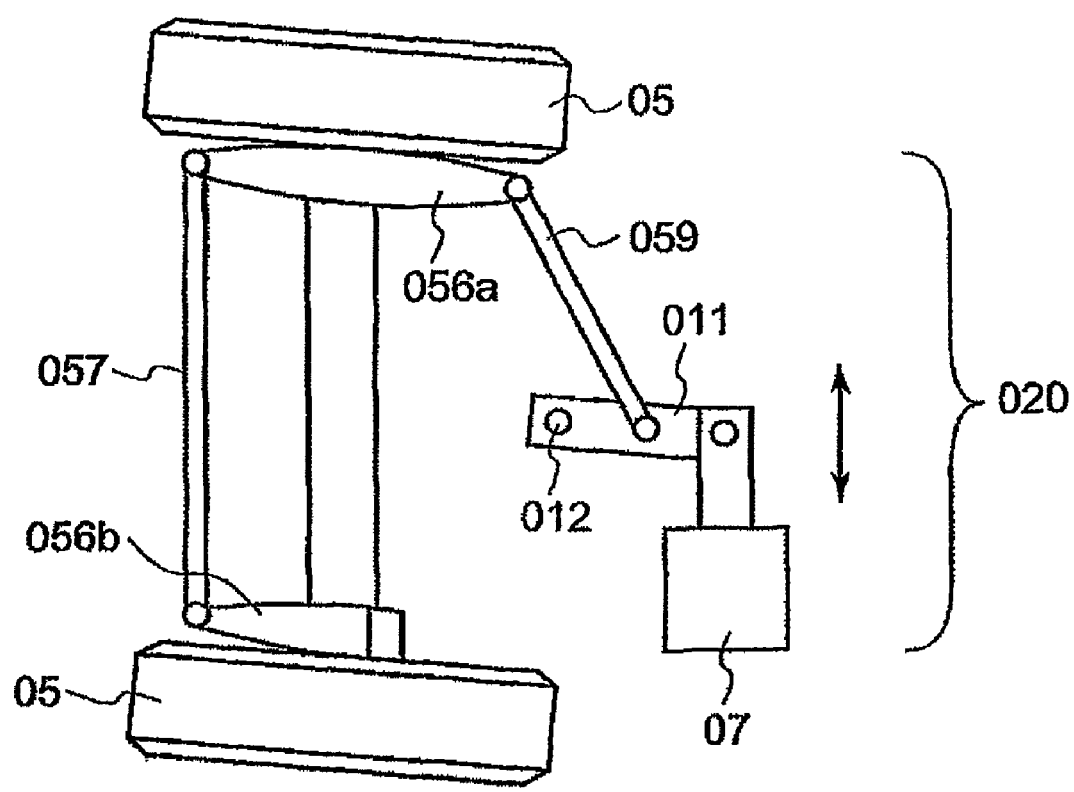
FIG. 14 is a schematic plan view of the conventional steering system.

FIG. 11 is a schematic plan view of a second embodiment of the tramway transit system, and FIG. 12 is a schematic side elevation of the second embodiment.

The First Embodiment

Referring to FIGS. 1-3 showing the first embodiment of the tramway transit system 10 of the invention, a tramway vehicle 12 runs along a track 01. The track is composed such that a protection track 14 having a groove of U-shaped cross section is provided on the road surface 15 of the track 01 along the center thereof.

The vehicle 12 runs in direction a. The vehicle 12 has a front bogie 16 and a rear bogie 18 under the vehicle body. A front axle 44 of front wheels 20 and a rear axle (not shown in the drawings) of rear wheels 22 are attached to the front bogie 16 and rear bogie 18 respectively rotatable in right and left directions. The front and rear wheels have rubber tires not shown distinctly in the drawing.

Next, a steering mechanism 26 for front wheels 20 will be explained. As to a steering mechanism 26 for rear wheels 20 is the same in construction to that of the front one, and explanation is omitted.

As shown in FIGS. 1-3, to a left front-wheel 20a are attached a front steering arm 28a extending forward and a rear steering arm 30a extending rearward. To a right front-wheel 20b are attached a rear steering arm 30b extending rearward. The rear ends of the rear steering arms 30a and 30b are connected by a tie rod 32 via spherical joints 34 respectively for rotation.

An end of a movable rod 38 of an actuator 36 is connected to the forward end part of the front steering arm via a spherical joint 34 for rotation. The actuator 36 is attached to the front bogie 16. Construction of the actuator 36 will be explained later.

A so-called Ackermann-Junt type link mechanism is composed by the tie rod 32, rear steering arms 30a and 30b, and angle of traverse of the right wheel and left wheel can be controlled adequately when turning.

Next, guard wheels 40 will be explained. Each of the guard wheels 40 is of a cylindrical shape and supported rotatably by protector arm 42 at the lower face of the forward end and rearward end thereof respectively. The guard wheels 40 are inserted into the U-shaped groove of the protection track 14 so that their peripheries face the side walls of the groove. The guard wheel 40 is preferably made of material having high vibration absorption property and high wear resistant property such as urethane rubber or material containing steel belt used in rubber tires.

Between the periphery of the guard wheel and the side walls of the groove of the protection track 14 are provided gaps smaller than permissible gaps so that deviation of the vehicle 12 to right or left is restricted in a limited value. In a normal state, the guard wheel 40 does not contact the side wall of the groove of the protection track 14. Usually, the gap between the periphery of the guard wheel and the side wall of the protection track is determined to be about 80 mm~100 mm.

A protector arm 42 extends forward and rearward and is supported at its center part rotatably by a shaft 47 attached to the under side of the front axle 44 of the front wheels 20 and supported there for rotation.

A connecting rod 46 connects the forward end of the front steering arm 28a and a point near the forward end of the forwardly extending arm by means of spherical joints 34 so that the protector arm 42 are directed in the same direction of the steered front wheels 20.

The steering mechanism 26 is comprised of the actuator 36, movable rod 38, front steering arm 28a, and rear steering arms 30a, 30b. An interlocking mechanism 48 is comprised of the forward protector arm 42 and connecting rod 46.

The spherical joint 34 provided at the forward end of the front steering arm 28a is composed as a twin spherical joint 50 as shown in FIG. 4. An end of the movable rod 38 of the actuator 36 and an end of the connecting rod 46 are connected to the forward end of the front steering arm 28a by means of the twin spherical joint 50 in a state the movable rod 38 runs above the connecting rod 46. The end of the movable rod 38 is connected to an upper spherical joint 52 and the end of the connecting rod 46 is connected to a lower spherical joint 54 of the twin spherical joint 50. By adopting the twin spherical joint 50, effective utilization of space is possible.

More specifically, by locating the connecting rod 46 and actuator 36 in the left side of the vehicle 12 where the connecting rod 46 is provided, a space is secured in the right side of the vehicle 12, and it is possible to locate a control device of the actuator, etc. in the space.

By locating the connecting rod 46 and actuator 36 on one side of the vehicle 12, it is easy to deal with a circumstance when the tread of the wheels is short, when the actuator is large in size, and further when the center line of the vehicle 12 and that of the protection track 14 are deviated from each other.

As is shown in FIG. 5, the actuator 36 comprises several devices attached to a bracket 58 which is attached to the lower face of an upper wall 56 of an actuator box. In FIG. 5, a cylinder rod 62 of a hydraulic cylinder 60 attached to the bracket 58 is connected via a spherical rod end 64 to a pin 68 provided horizontally to a connecting bracket 66. The pin 68 is rotatable in a vertical plane in the direction indicated by an arrow b.

A linear guide 68 is attached to the connecting bracket 66, and the linear guide 68 is engaged slidably with a linear rail 70 attached to the lower face of the upper wall 56. The linear rail extends in the same direction as the direction of movement of the cylinder rod 62. It is suitable to adopt instead of the linear guide 68 a linear guide composed such that a circular cross sectional grooves is formed on the sliding faces of the linear guide, balls are received in the grooves, and the linear guide can be moves low friction and low noise by virtue of rolling of the balls.

The movable rod 38 is connected to a spherical rod end 72 which is connected to the connecting bracket 66 via a pin 74. The pin 74 is provided vertically and rotatable in a rotation direction perpendicular to the rotation direction b (in a plane perpendicular to the paper face).

The movement of the cylinder rod 62 in its longitudinal direction is transferred to the movable rod 38 which is slanted as shown in FIG. 3. As the pin 68 connects the cylinder rod 62 to the connecting bracket 66 rotatably in the direction b, and the pin 74 connects the movable rod 38 to the connecting bracket 66 rotatably in the direction perpendicular to the direction b, the movement of the cylinder rod 62 in its longitudinal direction can be transferred smoothly to the movable rod 38 so that the movable rod 38 moves in its longitudinal direction. Further, as the cylinder rod 62 receives force only in the direction of the hydraulic cylinder 60, the hydraulic cylinder can be actuated smoothly.

To the bracket 58 are attached a two-way discharge pump 76 for supplying working oil to the hydraulic cylinder 60, a variable speed, reversible rotation motor 78, and a working oil storage tank 80. A block diagram of a hydraulic circuit connecting these devices is shown in FIG. 6. In FIG. 6, the hydraulic circuit 82 is constituted to be a closed circuit including in addition to said devices relief valves 86a and 86b which open to release the working oil to the storage tank 80 when pressure in the circuit is higher than a permissible pressure. As the hydraulic cylinder 60 is of a single rod type, a compensation circuit 84 consisting of e micro-shuttle valve 88 and an oil storage tank 80 is provided in order to compensate the difference in volume of both actuation rooms inside the cylinder due to the volume of the rod.

Construction and function of the micro-shuttle valve 88 will be explained referring to FIGS. 7a-7c. FIGS. 7a and 7c show states when the hydraulic cylinder 60 is operated, and FIG. 7b shows a state the hydraulic cylinder 60 is not operated. As shown in FIG. 7a, when working oil is supplied by the two-way discharge pump 76 to an actuation room 61a of the hydraulic cylinder 60 through an oil passage 90, a piston 61c is moved toward an actuation room 61b, and at the same time a shuttle valve body 92 of the micro-shuttle valve 88 is pushed in direction indicated by an arrow d by the pressure in the oil passage 90 and the valve body 92 is seated onto a valve seat 96 to close an opening at the valve seat. Therefore, a part of the working oil discharged from the actuation room 61b enters the micro-shuttle valve 88, and then flows through an oil passage 93 to the storage tank 80.

When the piston 61c moves toward the actuation room 61b, the amount of oil discharged from the actuation room 61b is larger than the amount of oil supplied to the actuation room 61a by the volume of the cylinder rod 62 in the actuation room 61a, and the excess oil flows into the micro-shuttle valve 88, so the amount of oil discharged from the pump 76 becomes the same to the amount of oil sucked by the pump 76.

When working oil is supplied by the two-way discharge pump 76 to the actuation room 61b and the piston 61c moves toward the actuation room 61a as shown in FIG. 7c, the amount of oil discharged from the actuation room 61a is smaller than the amount of oil supplied to the actuation room 61b by the volume of the cylinder rod 62 in the actuation room 61a, so the pressure in the oil passage 98 becomes larger than the pressure in the oil passage 90. Therefore, the shuttle valve body 92 of the micro-shuttle valve 88 moves in the direction indicated by an arrow e, and the valve body 92 is seated onto a valve seat 94 to close an opening at the valve seat and open the opening at the valve seat 96. As a result, the amount of oil corresponding to the volume of the cylinder rod 62 in the actuation room 61a flows from the storage tank 80 through the micro-shuttle valve 88 to the oil passage 90, so the amount of oil discharged from the pump 76 becomes the same to the amount of oil sucked by the pump 76.

In FIG. 6, the variable speed, reversible rotation motor 78 is provided with a sensor 102 for detecting rotation direction and rotation speed of the motor, and the hydraulic cylinder 60 is provided with a sensor 104 for detecting position of the piston 61c. Data detected by these sensors are sent to a controller 100, and rotation speed and direction of the motor 78 are controlled by the controller 100.

In the first embodiment, usually the actuator 36 is actuated on a steering directive signal from a control means 106 to apply steering force to the left front wheel 20a, and the steering force is transmitted from the front steering arm 28a to the right front wheel 20b via the rear steering arm 30a and tie rod 32. The steering force of the actuator 36 is also transmitted to the protector arm 42 via the twin spherical joint 50 and connecting rod 46, and the protector arm 42 is turned in accordance with the actuation of the actuator 36 so that the protector arm 42 is turned to the same direction of the front wheels 20, that is, the center line connecting the centers of the both guard wheels 40 is brought to be directed in the same direction of the front wheels 20. Therefore, the vehicle 20 travels along the tramway with the guard wheels 40 not contacting the side walls of the protection track 14.

Next, vehicle operation control in the first embodiment will be explained referring to FIGS. 8-10.

As shown in a block diagram of a control system of FIG. 8, a geographic site signal on the track 01, position information of the vehicle, and contact detection signal are inputted to the control means 106.

The geographic site signal (geographic site information) is position information sent from non-excited on-ground devices 02 which are laid down at a subscribed spacing on the ground along all over the track 10 as explained in the description of the related art. The information sent from the on-ground devices 02 includes discrimination number of each on-ground device, its position information, track information, and control information. In the position information are included the absolute coordinate point of each on-ground device and distance form a reference point. It is suitable to use transponders as on-ground devices.

The position information of vehicle is a signal having information where the vehicle is positioned, the position of the vehicle being calculated using distance between the on-ground device 02 obtained by GPS (Global Positioning System), pulse signals of rotation numbers of the wheels, pulse signals of rotation numbers of the drive motor, etc. It is suitable to send position information of the vehicle from a monitoring center, commanding center, etc. by a radio signal.

The contact detection signal is a signal sent when a limit sensor attached to the protector arm 42 or pulse sensors of rotation of the guard wheels or a steering force sensor provided on the steering mechanism 26, etc. detect that the guard wheels 40 contact the protection track 14.

The control means 106 includes a track information judging means 108, a normal traveling control means 110 for controlling the steering mechanism 26 when the track information judging means 108 has judged the vehicle is traveling on a usual linear straight part or curved part of the track, a fail-safe means 112 for performing fail-safe control when the steering mechanism 26, etc. has experienced trouble, and a vehicle attitude correction means 114 for correcting the attitude of the vehicle when the track information judging means 108 judges that the vehicle is on a station or ramification.

The control means 108 may be provided on the vehicle or in a off-vehicle space such as the monitoring center or commanding center thereby establishing a control system for collective controlling.

Next, control process will be explained referring a flowchart of FIG. 9. First, the track information judging means 108 makes judgments of the geographic site signal (geographic site information) based on the vehicle position information, etc., (S1). The track information judging means 108 judges where the vehicle is and what part of the track the vehicle is traveling, for straight part or curved part or station part or ramification point. The judging means 108 can judge beforehand the presence of a station, ramification point, sharp curve, etc. in several meters ahead of the vehicle.

When it is judged by the track information judging means 108 that the vehicle is traveling on a usual straight or curved part, control of the vehicle is performed by the normal traveling control means 110.

The normal traveling control means 110 detects where the vehicle is traveling and decide a steering pattern based on the present position of the vehicle and the track data memorized beforehand in a memory of the control means 106, (S3). Then the control means 110 switches on automatic steering, (S5) to send automatic steering directive signal to the actuator 36 to commence automatic steering according to the steering pattern, (S7). Then the front wheels 20 are steered by means of the actuator 36 to guide the vehicle.

Whether the guard wheels 40 contact the protection track 14 or not is judged based on the contact detecting signal during the vehicle is traveling under the automatic steering pattern, (S9). When a trouble happens to the steering mechanism 26, for example when the vehicle 12 is in danger of running off the track 01, the guard wheels 40 contact the protection track 14 and a contact detection signal is sent out. YES or NO of reception of the contact detection signal is detected, and when YES, the steering mechanism is judged to be in trouble and control by the fail-safe means 112, and when NO, the steering mechanism is judged to be in normal operation and the automatic steering according to the steering pattern is continued, (S10).

The control by the fail-safe means is performed such that, first the automatic steering is switched off to cancel the steering by the actuator 36 and the steering mechanism 26 is put in a free state. Then the front wheels 20 are steered by the movement of the protector arm 42, which movement is restricted by the contact of the guard wheels 40 with the protection track 14. That is, the vehicle 12 is guided by a mechanical feedback of the contact of the guard wheels 40 and protection track 14, (S13). The steering command is reset, (S15).

In this way, safe traveling of the vehicle is guaranteed by providing the fail-safe means 112 even when trouble happens in the steering mechanism 26 of the vehicle 12, and safety and reliability of passenger transportation can be secured.

When it is judged by the track information judging means 108 that the vehicle is at a station or ramification point, or the vehicle is nearing the station or ramification point, control by the vehicle attitude correction means 114 is performed.

The control by the vehicle attitude correction means 114 is performed such that, first the automatic steering is switched off, (S17). Then, as shown in FIG. 10, when the vehicle 12 arrives at a vehicle attitude correcting section 118 where vehicle attitude adjusting members 116 are provided at the both side faces of the protection track 14, the attitude of the vehicle 12 is corrected and reset forcibly by the vehicle attitude adjusting members 116 via the guard wheels 40. That is, the steering mechanism is reset in initial attitude by mechanically forced feedback and the attitude of the vehicle 12 is reset in the initial state on the track 01, (S19). Then the steering command is reset, (S21).

Then, when it is judged that the vehicle 12 passed the vehicle attitude correcting section 118 by a geographical site signal from the on-ground device 02, (S23), a steering pattern is newly determined based on the vehicle position information, (S25).

Then the automatic steering is switched on, (S27), and an automatic steering command according to the newly determined steering command is sent to the actuator 36 to commence automatic steering, (29).

The width between the both side walls of the protection track 14 in the vehicle attitude correcting section 118 determined for the guard wheels 40 to contact the walls, concretively the width is determined to be larger by 1 mm~5 mm than the diameter of the guard wheel. The longitudinal length of the vehicle attitude correcting section 118 along the protection track 14 is determined to be at least longer than the length of the vehicle, preferably 1-3 times the length of the vehicle.

Therefore, when the vehicle 12 passes the vehicle attitude correcting section 114, the guard wheels 40 contact the position adjusting members 116 provided to the side walls of the protection track 14, as a result the direction of the protector arm is corrected so that the guard wheels 40 can travel along the protection track 14 without contacting the side walls of the protection track 14. Therefore, when drifting to right or left or yawing of the vehicle occurs due to various disturbances, the attitude of the vehicle is corrected by the vehicle attitude correction means 114 to the initial original attitude or desired attitude.

The vehicle attitude correcting sections 118 are preferably provided near each station in order to keep a correct clearance between the vehicle and the platform of the station and near each ramification point.

According to the first embodiment, the electrically driven oil hydraulic actuator 36 provided with the variable speed, reversible rotation motor 78 and two-way discharge pump 76 are adopted and the flow direction of working oil are controlled by the variable speed, reversible rotation motor 78 and two-way discharge pump 76, so it is not necessary to provide a control valve, orifice, etc. in the hydraulic circuit 82. Therefore, energy loss other than that due to the friction loss in the hydraulic cylinder 60 and that due to flow resistance in the circuit 82 can be eliminated.

When the actuator 36 is not operated, operation of the variable speed, reversible rotation motor 78 and two-way discharge pump 76 is stopped, so consumption of electric power is saved and energy is saved dramatically as compared with the conventional actuator.

Further, as a control valve, orifice, etc. are not required to be provided in the hydraulic circuit 82, composition of the hydraulic circuit become compact, a special space for composing hydraulic circuit is not required and piping is minimized resulting reduced fear of oil leaks. Therefore, the hydraulic circuit 82 can be attached easily to the bogie where space is very limited.

As the drive directive to the variable speed, reversible rotation motor 78 can be given by a control program, the variable speed, reversible rotation motor 78 can be easily controlled, and the motor 78 can resist damage even when excessive reaction force is applied the motor 78.

Further, as the hydraulic circuit 82 is composed as a closed circuit and working oil moves between the both actuation rooms of the hydraulic cylinder when the piston 61c of the hydraulic cylinder 60 receives reaction force applied to the guard wheels 40 when an abnormality occurs in the automatic steering mechanism 26 and the guard wheels 40 contact the protection track 14, force exerted to actuator 36 due to the reaction force is smaller as compared with a case a ball screw type actuator is adopted.

As the relief valves 86a, 86b are provided to limit maximum pressure in the hydraulic circuit 82, pressure in the hydraulic circuit 82 does not exceed a permissible pressure.

Further, as the hydraulic circuit 82 is of a closed circuit, the hydraulic cylinder 60 functions as a damper. Therefore, traveling of the vehicle guided by the guard wheels is stable even when an abnormality occurs to the automatic steering mechanism. Further, as a clutch and ball screw which inevitably accompany friction losses are not used, deterioration in control performance caused by friction does not occur.

By providing the compensation circuit 84 consisting of the micro-shuttle valve 88 and oil storage tank 84, difference between amounts of inflow and outflow working oil in the hydraulic cylinder due to single rod type of the hydraulic cylinder can be compensated, and the suction and discharge oil amount of the two-way discharge pump is balanced with each other resulting in smooth operation of the pump.

The system is composed such that where of the track the vehicle is traveling, straight part or curved part or station part or ramification part, is judged by the track information judging means 108, and operation by the normal traveling control means 110 or operation by the vehicle attitude correction means 114 are adopted based on the judgment, so safety and reliability of the automatically steered traveling of the vehicle are increased, and efficient and high speed traveling of the vehicle can be made possible.

Further, when a trouble occurs in the steering mechanism, the guard wheels contact the side walls of the protection track and the vehicle 12 is steered by the guard wheels 40, that is, the vehicle 12 is guided by the guard wheels 40 and protection track 14, so safe traveling of the vehicle is guaranteed even when malfunction occurs in the steering mechanism, and safety and reliability of passenger transportation can be secured.

Further, the steering mechanism is composed such that the tie rod 32, forwardly extending steering arm 28a, and backwardly extending steering arm 30a are provided and the front wheel of one side is applied force to turn the wheel by the actuator 36, so the wheels of both right and left sides can be steered steadily.

The Second Embodiment

Next, a second embodiment is explained referring to FIGS. 11 and 12. The second embodiment is a modification of the first embodiment, and constituents the same to those of the first embodiment are indicated by the same reference numerals, of which explanation is omitted.

As shown in FIG. 11, The fundamental structure of the steering mechanism 26 is similar to the first embodiment. The second embodiment is constructed by adding to the first embodiment restoration spring devices 124, and other than this is the same to the first embodiment. Each of the restoration spring devices 124 is a device comprising a spring member, a coil spring for example, to push the protector arm 42 in order to allow the guard wheels 40 to take a central position in the protection track 14.

According to the embodiment, when malfunction occurs in the automatic steering mechanism 26 and the vehicle is steered guided by the guard wheels 40, the protector arm 42 is allowed to coincide with the vehicle traveling direction by the restoration spring device 124. Therefore, the vehicle can travel stably even when malfunction occurs in the automatic steering mechanism 26. Particularly when traveling at high speed, control of the vehicle is difficult and the vehicle tends to travel snaking its way, so the provision of the restoration spring devices 124 is effective.

According to the invention, in a tramway transit system with fail-safe function in which a vehicle provided with guard wheels travels while automatically steered on a pre-established track provided with a protection track, simplification in construction and weight saving of the automatic steering mechanism, and space saving for the installation of the mechanism, can be attained, and reaction force exerted on the automatic steering mechanism caused by reaction force which the guard wheels receive from the protection track due to contact of the wheels with the protection track when malfunction occurs in the automatic steering mechanism, is reduced, and stable traveling of the vehicle is secured.

The invention claimed is:

1. A tramway transit system, comprising:
a pre-established track; and
a vehicle for traveling along the pre-established track,
   wherein
   the vehicle includes steering mechanisms each having an electrically driven oil hydraulic actuator for steering front wheels and rear wheels of the vehicle automatically,
   the track includes a protection track laid down on the track,
   the vehicle further includes
      a guard wheel assembly provided at front and rear parts respectively under the vehicle, the guard wheel assembly having a pair of guard wheels which protrude into a groove of the protection track without contacting side walls thereof, and
      interlocking mechanisms so that a center line connecting centers of the each pair of the guard wheels is directed by the steering mechanisms in the same direction of the front wheels or rear wheels during traveling of the vehicle,
   wherein said electrically driven oil hydraulic actuator comprises
      a hydraulic cylinder having a cylinder rod connected via a movable rod to at least one of right and left wheels of the vehicle,
      a two-way discharge pump for supplying working oil to both actuating rooms of the hydraulic cylinder, a variable speed, reversible rotation motor for driving the two-way discharge pump, and
      a closed hydraulic circuit including the two-way pump and the hydraulic cylinder and having relief valves for releasing the working oil to an oil storage tank when pressure in the hydraulic circuit exceeds a prescribed permissible pressure,
   wherein
   said system further comprises (i) protection arms each having forward and rearward ends extending forward and rearward of the vehicle, respectively, and (ii) steering arms each of which has an end part connected to an end part of the corresponding protection arm via a connecting rod, thereby the guard wheels are moveable without contacting the side walls of the groove of the protection track,
   said pair of guard wheels provided at the front part and the rear part respectively under the vehicle is constructed so that the guard wheel of the vehicle are respectively connected to the forward and rearward ends of the protection arm, and
   said protection arms are respectively provided to a front bogie of the front part of the vehicle and a rear bogie of the rear part of the vehicle such that each said protection arm is supported at a center part thereof rotatably in a width direction of the protection track by the front bogie and the rear bogie respectively.

2. A tramway transit system according to claim 1, wherein the cylinder rod of said hydraulic cylinder and said guard wheel assembly are connected by a mechanical link mechanism, whereby steering of the vehicle is compensated by a reaction force of the guard wheels received from the protection track when the guard wheels contact the side walls of the groove of the protection track.

3. A tramway transit system according to claim 1, wherein the hydraulic cylinder is a single rod and a compensation circuit is provided to the closed hydraulic circuit so that a difference between an amount working oil flowing into one of the actuating rooms of the hydraulic cylinder and an amount of working oil flowing out from the other actuating room of the hydraulic cylinder is compensated so as to equalize suction amount and discharge amount of working oil of the two-way discharge pump.

4. A tramway transit system according to claim 1, wherein the cylinder rod of the hydraulic cylinder and the movable rod which extends obliquely to the cylinder rod are connected to a linear guide supported by a linear rail slidably in a longitudinal direction of the hydraulic cylinder.

5. A tramway transit system according to claim 1, wherein a restoration spring device is provided of which an end is fixed to the vehicle body and the other end is fixed to the guard wheel assembly so that the restoration spring device applies spring force to the guard wheel assembly so that the center line connecting centers of the pair of the guard wheels is always directed in the same direction of the vehicle straight traveling direction.

6. A tramway transit system comprises a vehicle for traveling along a pre-established track,
wherein
the vehicle is provided with a steering mechanism having an electrically driven oil hydraulic actuator for steering front wheels and rear wheels of the vehicle automatically,
the track is provided with a protection track laid down on the track, the vehicle is provided with a guard wheel assembly having at least a pair of guard wheels which protrude into a groove of the protection track without contacting side walls thereof,
at a front part and rear part respectively under the vehicle, an interlocking mechanism is provided so that a center line connecting centers of the pair of the guard wheels is directed by the steering mechanism in the same direction of the front wheels or rear wheels during traveling of the vehicle,
wherein said electrically driven oil hydraulic actuator comprises
a hydraulic cylinder having a cylinder rod connected via a movable rod to at least one of right and left wheels of the vehicle,
a two-way discharge pump for supplying working oil to both actuating rooms of the hydraulic cylinder, a variable speed, reversible rotation motor for driving the two-way discharge pump, and
a closed hydraulic circuit including the two-way pump and the hydraulic cylinder and having relief valves for releasing the working oil to an oil storage tank when pressure in the hydraulic circuit exceeds a prescribed permissible pressure,
wherein a restoration spring device is provided of which an end is fixed to the vehicle body and the other end is fixed to the guard wheel assembly so that the restoration spring device applies spring force to the guard wheel assembly so that the center line connecting centers of the pair of the guard wheels is always directed in the same direction of the vehicle straight traveling direction.

* * * * *